US012586382B2

(12) United States Patent
Gyllenhammar et al.

(10) Patent No.: US 12,586,382 B2
(45) Date of Patent: Mar. 24, 2026

(54) METHOD AND SYSTEM FOR IN-VEHICLE SELF-SUPERVISED TRAINING OF PERCEPTION FUNCTIONS FOR AN AUTOMATED DRIVING SYSTEM

(71) Applicant: ZENSEACT AB, Gothenburg (SE)

(72) Inventors: Magnus Gyllenhammar, Pixbo (SE); Adam Tonderski, Västra Frölunda (SE)

(73) Assignee: ZENSEACT AB, Gothenburg (SE)

( * ) Notice: Subject to any disclaimer, the term of this patent is extended or adjusted under 35 U.S.C. 154(b) by 287 days.

(21) Appl. No.: 18/452,045

(22) Filed: Aug. 18, 2023

(65) Prior Publication Data

US 2024/0062553 A1 Feb. 22, 2024

(30) Foreign Application Priority Data

Aug. 18, 2022 (EP) ..................................... 22190964

(51) Int. Cl.
*G06V 20/56* (2022.01)
*G06V 10/764* (2022.01)
*G06V 10/778* (2022.01)

(52) U.S. Cl.
CPC ............ *G06V 20/56* (2022.01); *G06V 10/764* (2022.01); *G06V 10/7792* (2022.01)

(58) Field of Classification Search
None
See application file for complete search history.

(56) References Cited

U.S. PATENT DOCUMENTS

| | | | |
|---|---|---|---|
| 11,410,475 B2 * | 8/2022 | Golov ................. | B60R 21/0134 |
| 2019/0042937 A1 | 2/2019 | Sheller et al. | |
| 2021/0112441 A1 | 4/2021 | Sabella et al. | |

(Continued)

FOREIGN PATENT DOCUMENTS

CN 112700639 A 4/2021

OTHER PUBLICATIONS

Saeed, A., et al.; "Federated Self-Supervised Learning of Multi-Sensor Representations for Embedded Intelligence"; IEEE Internet of Things Journal, vol. 8, No. 2; Jan. 15, 2021; 11 pages.

(Continued)

*Primary Examiner* — Oneal R Mistry
(74) *Attorney, Agent, or Firm* — Sage Patent Group

(57) ABSTRACT

A method for updating a perception function of a vehicle having an Automated Driving System (ADS) is disclosed. The ADS has a self-supervised machine-learning (ML) algorithm for reconstructing an ingested image and a ML algorithm for an in-vehicle perception module for detecting one or more objects or free-space areas depicted in an ingested image. At first, an image of a scene in a surrounding environment of the vehicle is obtained. The obtained image is processed to obtain an output image with one or more detected objects or free-space areas. Then, an evaluation dataset is formed accordingly. The evaluation dataset and the obtained image is processed to obtain a reconstruction error value for each evaluation image and an evaluation image with highest reconstruction error value is selected among plurality of evaluation images. Using the obtained image and the selected evaluation image, the ML algorithm for the in-vehicle perception module is updated.

14 Claims, 5 Drawing Sheets

(56) References Cited

U.S. PATENT DOCUMENTS

| | | | |
|---|---|---|---|
| 2021/0325901 A1 | 10/2021 | Gyllenhammar et al. | |
| 2021/0350150 A1 | 11/2021 | An et al. | |
| 2022/0114805 A1* | 4/2022 | Jarquin Arroyo | G06N 3/08 |
| 2022/0351009 A1* | 11/2022 | Yang | G06T 7/254 |
| 2024/0140484 A1* | 5/2024 | Zeng | B60W 50/0097 |
| 2024/0393804 A1* | 11/2024 | Tananaev | G06V 20/58 |

OTHER PUBLICATIONS

Yu, J., et al.; "Free-Form Image Inpainting With Gated Convolution"; 2019 IEEE/CVF International Conference on Computer Vision (ICCV); Oct. 27, 2019; 10 pages.

Savarese, P., et al.; "Information-Theoretic Segmentation by Inpainting Error Maximization"; https://arxiv.org/abs/2012.07287 Cornell University Library; Apr. 20, 2021, 13 pages.

Yang, Y., et al.; "Unsupervised Moving Object Detection via Contextual Information Separation"; 2019 IEEE/CVF Conference on Computer Vision and Pattern Recognition (CVPR); https://arxiv.org/abs/1901.03360; Jun. 15, 2019; 10 pages.

Bao, H., et al. (2021), "BEiT: BERT Pre-Training of Image Transformers"; Cornell University Library; arxiv.org/abs/2106.08254; Jun. 15, 2021; 18 pages.

He, K., et al.; "Masked Autoencoders Are Scalable Vision Learners"; Cornell University Library; https://arxiv.org/abs/2111.06377; Dec. 19, 2021; 14 pages.

Xie, Z., et al.; "SimMIM: A Simple Framework for Masked Image Modeling"; Cornell University Library; https://arxiv.org/abs/2111.09886; Nov. 18, 2021; 13 pages.

Zhou, J. et al.; "iBOT: Image BERT Pre-Training with Online Tokenizer"; Cornell University Library; https://arxiv.org/abs/2111.07832; Nov. 15, 2021; 29 pages.

Extended European Search Report mailed Jan. 24, 2023 for European Patent Application No. 22190964.1, 13 pages.

* cited by examiner

METHOD AND SYSTEM FOR IN-VEHICLE SELF-SUPERVISED TRAINING OF PERCEPTION FUNCTIONS FOR AN AUTOMATED DRIVING SYSTEM

CROSS-REFERENCE TO RELATED APPLICATIONS

The present application for patent claims priority to European Patent Office Application Ser. No. 22190964.1, entitled "METHOD AND SYSTEM FOR IN-VEHICLE SELF-SUPERVISED TRAINING OF PERCEPTION FUNCTIONS FOR AN AUTOMATED DRIVING SYSTEM" filed on Aug. 18, 2022, assigned to the assignee thereof, and expressly incorporated herein by reference.

TECHNICAL FIELD

Embodiments disclosed herein generally relate to systems and methods for updating a perception function of an Automated Driving System (ADS). In particular, embodiments disclosed herein relate to systems and methods for updating a perception function of an Automated Driving System (ADS) by utilizing a self-supervised machine-learning algorithm to facilitate the updating/training process of the perception network used for the operational tasks of the ADS.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance systems, forward collision warning systems, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle in traffic, as well as forming an awareness of the surroundings. While the ADS has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, obstacles, free-space areas, relevant signage, and so forth.

Machine Learning (ML), such as Deep Learning (DL), is a promising technology in the area of perception, for example in order to detect and classify objects in images, video streams and/or LIDAR point clouds. However, the problem with many deep neural networks is that they quickly reach some level of performance (maturity), and that extremely large amounts of data are required to get further improved performance. Annotating millions of images is expensive, and hence many initiatives are taken in the autonomous driving field to reduce this cost through semi-automated annotation and learning efficiently from annotated data. However, even with these advances it is still a very costly process.

There is accordingly a need in the art for new solutions for facilitating development of ADS functions, and in particular for the ADS's perception functionality, in order to continuously be able to provide safer and better performing systems. As always, the improvements shall preferably be made without significant negative impact on the size, power consumption and cost of the on-board system or platform.

SUMMARY

The present invention seeks to mitigate, alleviate or eliminate one or more of the above-identified deficiencies and disadvantages in the prior art to address various problems relating to the development of ADS functions, and in particular for the development of an ADS's perception functionality.

Various aspects and preferred embodiments of the disclosed invention are defined below and in the accompanying independent and dependent claims.

According to some aspects there is provided a method for updating a perception function of a vehicle having an Automated Driving System (ADS). The ADS comprises a self-supervised machine-learning algorithm configured to reconstruct an ingested image and a machine-learning algorithm for an in-vehicle perception module configured to detect one or more objects or free-space areas depicted in an ingested image. The method comprises obtaining an image of a scene in a surrounding environment of the vehicle, and processing the obtained image, by means of the machine-learning algorithm for the in-vehicle perception module, in order to obtain an output image with one or more detected objects or free-space areas, each detected object or free-space area being indicated in the output image. The method further comprises forming an evaluation dataset based on the obtained output image, where the evaluation dataset comprises a plurality of evaluation images corresponding to the scene comprised in the obtained image with masked permutations of the indications of the one or more detected objects or free-space areas in the output image. Furthermore, the method comprises processing the evaluation dataset and the obtained image, by means of the self-supervised machine-learning algorithm, in order to obtain a reconstruction error value for each evaluation image, and selecting an evaluation image out of the plurality of evaluation images, wherein the selected evaluation image has the highest reconstruction error value under a regularization restriction defined based on at least a size of the masked and permuted indications. The method further comprises updating the machine-learning algorithm for the in-vehicle perception module based on the obtained image and the selected evaluation image, wherein the permuted indication of the selected evaluation image defines a ground truth.

According to some aspects there is provided a computer program product comprising instructions which, when the program is executed by a computing device, causes the computer to carry out the method according to any one of the embodiments disclosed herein. With this aspect of the, similar advantages and preferred features are present as in the other aspects of the invention.

According to some aspects, there is provided a (non-transitory) computer-readable storage medium comprising instructions which, when executed by a computing device, causes the computer to carry out the method according to any one of the embodiments disclosed herein. With this aspect of the invention, similar advantages and preferred features are present as in the other aspects of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to some aspects, there is provided a system for updating a perception function of a vehicle having an Automated Driving System (ADS). The ADS comprises self-supervised machine-learning algorithm configured to reconstruct an ingested image and a machine-learning algorithm for an in-vehicle perception module configured to detect one or more objects or free-space areas depicted in an ingested image. The system comprises control circuitry configured to obtain an image of a scene in a surrounding environment of the vehicle, and process the obtained image, by means of the machine-learning algorithm for the in-vehicle perception module, in order to obtain an output image with one or more detected objects or free-space areas. Each detected object or free-space area is indicated in the output image. The control circuitry is further configured to form an evaluation dataset based on the obtained output image. The evaluation dataset comprises a plurality of evaluation images corresponding to the scene comprised in the obtained image with masked permutations of the indications of the one or more detected objects or free-space areas in the output image. Furthermore, the control circuitry is configured to process the evaluation dataset and the obtained image, by means of the self-supervised machine-learning algorithm, in order to obtain a reconstruction error value for each evaluation image. The control circuitry is further configured to select an evaluation image out of the plurality of evaluation images, where the selected evaluation image has the highest reconstruction error value under a regularization restriction defined based on at least a size of the masked and permuted indications. Further, the control circuitry is configured to update the machine-learning algorithm for the in-vehicle perception module based on the obtained image and the selected evaluation image, where the permuted indication of the selected evaluation image defines a ground truth. With this aspect of the invention, similar advantages and preferred features are present as in the other aspects of the invention.

According to some aspects, there is provided a vehicle comprising a system for updating a perception function of the vehicle according to any one of the embodiments disclosed herein. With this aspect of the invention, similar advantages and preferred features are present as in the other aspects of the invention.

An advantage of some embodiments is that efficient and effective incorporation of new data into the trained machine-learning algorithms used for detection and tracking tasks in ADS-equipped vehicles is achievable with increased performance and reliability as a result.

An advantage of some embodiments is that capturing of rare scenarios (corner cases) experienced by the vehicles in the training of the machine-learning algorithms used for perception functionality is facilitated.

An advantage of some embodiments is that automatic training of machine-learning algorithms used for perception functionality in ADS-equipped vehicles is enabled, also for novel data, which is particularly relevant and useful during e.g. Operational Design Domain (ODD) expansion.

An advantage of some embodiments is that federated learning of CNN-based networks without the need for manual annotations is supported.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
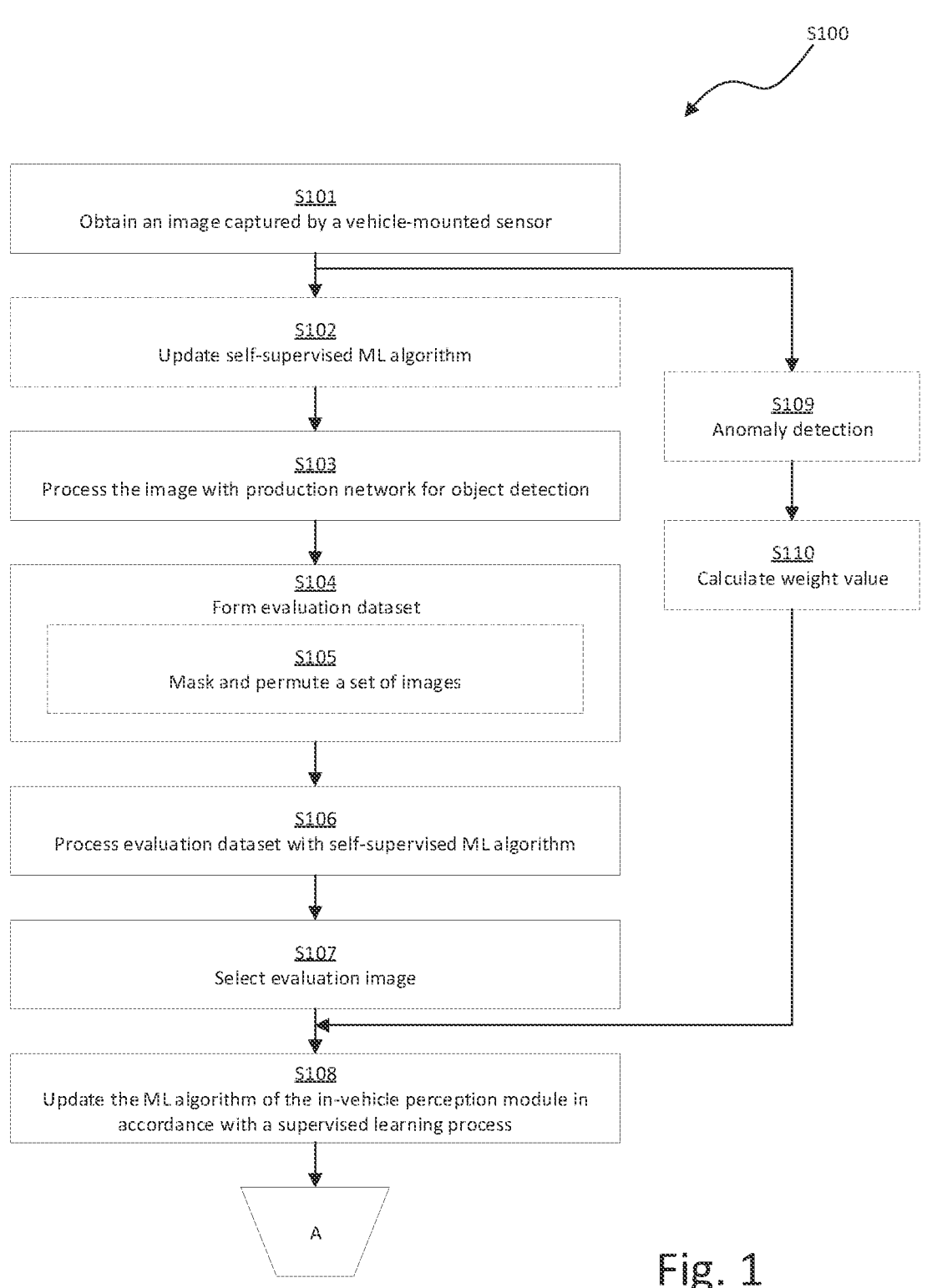
FIG. 1 is a schematic flowchart representation of a method for updating a perception function of an ADS-equipped vehicle in accordance with some embodiments.

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/ comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. The term "obtaining" is herein to be interpreted broadly and encompasses receiving, retrieving, collecting, acquiring, and so forth.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

In general, large volumes of training data are required in order to develop machine-learning algorithms to reach an adequate performance level for industrial purposes. This is particularly the case for "vision tasks" (i.e. perception functions), such as object detection and object classification, which commonly uses deep neural networks.

The need for large volumes of training data is even further amplified in the Autonomous Driving field, as the requirements for reaching the necessary integrity and performance levels before one can deploy an ADS in the field (i.e. in traffic), are immense. However, one general challenge that is associated with the acquisition of large volumes of training data for ADS development purposes such as the generation of annotated datasets is that they are known to be costly and/or labour-intensive. Other challenges that need to be addressed are for example related to bandwidth requirements, data storage capacity, and data privacy due to the consequential need of transmitting large, and potentially sensitive, datasets between entities.

Federated learning (FL) is a scheme where a "global" or "central" model is consolidated from "local" models trained at the edge. This is prevalent in "voice assistants" and "typing models" for e.g. smart phones. In the present context, the vehicles constitute the edge devices or nodes, while one or more remote servers may constitute the central server responsible for aggregating or consolidating the model updates from each of the edge devices. This would be referred to as centralized federated learning scheme. However, in some embodiments the need for a central entity may be omitted and the edge devices (e.g. a fleet of vehicles) may be configured to coordinate themselves to obtain the global model, as so called decentralized federated learning scheme. In the following the description is mainly given in reference to a centralized federated learning scheme. It is however presumed that those skilled in the art would readily appreciate how to implement the teachings herein to a decentralized federated learning scheme, and that the scope conveyed by the invention disclosed herein encompasses such a realization. It should be noted that the term "global" does not necessarily imply "worldwide", in the present context, but should instead be construed as something that is "shared" among a plurality of "local" entities.

A challenge that is associated with the use of Federated Learning is that the local models can only be trained if it is possible to construct a loss function (may also be referred to as a cost function). This challenge is even more prominent for supervised training in the Autonomous Driving field as it requires annotated datasets, which are as mentioned, difficult to obtain in large enough quantities. These requirements result in an almost impossible situation because it may be impossible to share the data (due to bandwidth requirements and data privacy/security reasons), and because it is generally infeasible to elicit accurate annotations of all data collected in the vehicles.

Recently, a new paradigm, using "self-supervised learning", has been proposed to, at least partly, alleviate the need for annotated data in the training process of machine-learning algorithms. Through this process the machine-learning algorithm of a perception function can be trained by using images with no need for annotations. Further background and details to the "self-supervised" learning is for example provided in Bao, H., et al. (2021), *BEiT: BERT Pre-Training of Image Transformers*; He, K., et al. (2021), *Masked Autoencoders Are Scalable Vision Learners*; Xie, Z., et al. (2021), *SimMIM: A Simple Framework for Masked Image Modeling*; Zhou, J. et al. (2021). *iBOT: Image BERT Pre-Training with Online Tokenizer.*

A "self-supervised machine-learning algorithm" is in the present context to be understood as a machine-learning algorithm (e.g. an artificial neural network) that does not require labelled or annotated data to learn. In some embodiments, the self-supervised machine-learning algorithm is an autoencoder (AE), such as a Masked Autoencoder (MAE), or any suitable transformer-based network. In some embodiments, the self-supervised machine-learning algorithm is trained/updated by manipulating (e.g. withholding) parts of an image and instructing the algorithm to reconstruct the manipulated image as part of its learning process. The reconstructed image is subsequently compared to the original image to create a loss function, which is used to update the model parameters (e.g. network weights and/or biases), as known in the art. The manipulation of the image(s) may for example be performed through masking, adding noise to the image, or a similar methodology as readily understood by a person skilled in the art. However, in some embodiments, the input data does not need to be manipulated in order to train the machine-learning algorithm but may instead be trained with a "raw input", such as for example in a conventional autoencoder. Thus, in some embodiments the self-supervised machine-learning algorithm may comprise an unsupervised machine-learning algorithm.

However, for multiple reasons one might not want to rely on self-supervised machine-learning algorithms or transformer-based networks (as the above-mentioned examples), as basis for decisions and various operations of an ADS. This may for example be because the accuracy and computational efficiency of these self-supervised machine-learning algorithms may be questioned in comparison with conventional machine-learning algorithms (e.g. Convolutional Neural Networks, CNNs) used for ADS perception functionality. Furthermore, the compatibility with approved hardware (HW) architectures may also be an issue.

However, the present inventors realized that these self-supervised machine-learning networks may still be utilized in the field of Automated Driving Systems to provide the technical benefit of improving the on-board perception functions (i.e. the "production system") in an efficient and reliable manner. In more detail, it is herein proposed to leverage this paradigm of "self-supervision" to construct a supervisory signal to the "production system" (e.g. a CNN-based perception function). In short, some embodiments comprise machine-learning algorithms that are trained through self-supervised learning using the sensory output (e.g. camera images, LiDAR images, Radar images, etc.) from the vehicle's on-board sensors. These self-supervised machine-learning algorithms are also iteratively queried with permuted masks of detections made by the production system's perception network in the sensory output to obtain a reconstruction loss/error. There permutations are created in order to judge the accuracy of the output of the production system's perception network (e.g. bounding boxes corresponding to objects) and the reconstruction loss/errors over the permuted and masked images may in some embodiments be used to form a loss/cost function for updating the production system's perception network.

Accordingly, by means of the technology disclosed herein, one can efficiently incorporate the various scenes and scenarios that the vehicles of a fleet are exposed to during normal operation in the training of the production network without the need for either transmitting huge datasets or annotating the data collected by each vehicle. Consequently, an efficient and automated process for improving the performance of the perception functionality of ADS-equipped vehicles is readily achievable. Moreover, an efficient expansion of the production network's operational capability into new regions and new use cases (i.e. Operational Design Domain expansion) at a faster pace is readily achievable.

An Operational design domain (ODD) is to be understood as a description of the operating domains in which an automated or a semi-automated driving system (i.e. AD or ADAS) is designed to function, including, but not limited to, geographic, roadway (e.g. type, surface, geometry, edges and markings), environmental parameters, connectivity, surrounding objects, and speed limitations. That is, the production network of the ADS may be associated with a specific environmental scenario and only configured to operate within an environment fulfilling a set of "scenario parameters", example scenarios are traffic jams, highway/expressway cruising, etc. The ODD may further define an allowable exposure rate to driving scenarios and their dynamics (e.g. traffic lights, intersections, jaywalkers, snow, ice, cut-ins, large animals, etc.). The "scenario parameters" may for example be obtained from sensor data from one or more vehicle-mounted sensors or communication data obtained from a remote server, or another vehicle via a Vehicle-to-Vehicle (V2V) communication protocol. The scenario parameters may for example be type of road, weather data, speed limitations, traffic density, number of available lanes, presence of road work, and so forth.

Thus, an advantage of some embodiments is that the training of machine-learning algorithms for providing perception functionality in ADS-equipped vehicles may be rendered more cost-effective and less labour-intensive as compared to the known prior art.

An advantage of some embodiments is that automated training of perception networks for use in ADS-equipped vehicles is made possible.

An advantage of some embodiments is that is that the training of machine-learning algorithms for providing perception functionality in ADS-equipped vehicles may be rendered more efficient in general as the need for transferring huge datasets, which may contain personal data, may be alleviated, which may not even be permitted in some countries.

Some embodiments further provide the advantage of increasing the possibility to capture rare cases (may also be referred to as corner cases) that can be incorporated in the training of the production network, even further increasing the performance at a higher pace as compared to the known prior art.

The machine-learning algorithms (may also be referred to as machine-learning models, neural networks, and so forth) are implemented in some embodiments using publicly available suitable software development machine learning code elements, for example, such as those which are available in PyTorch, Keras and TensorFlow or in any other suitable software development platform, in any manner known to be suitable to someone of ordinary skill in the art.

Figure 2:
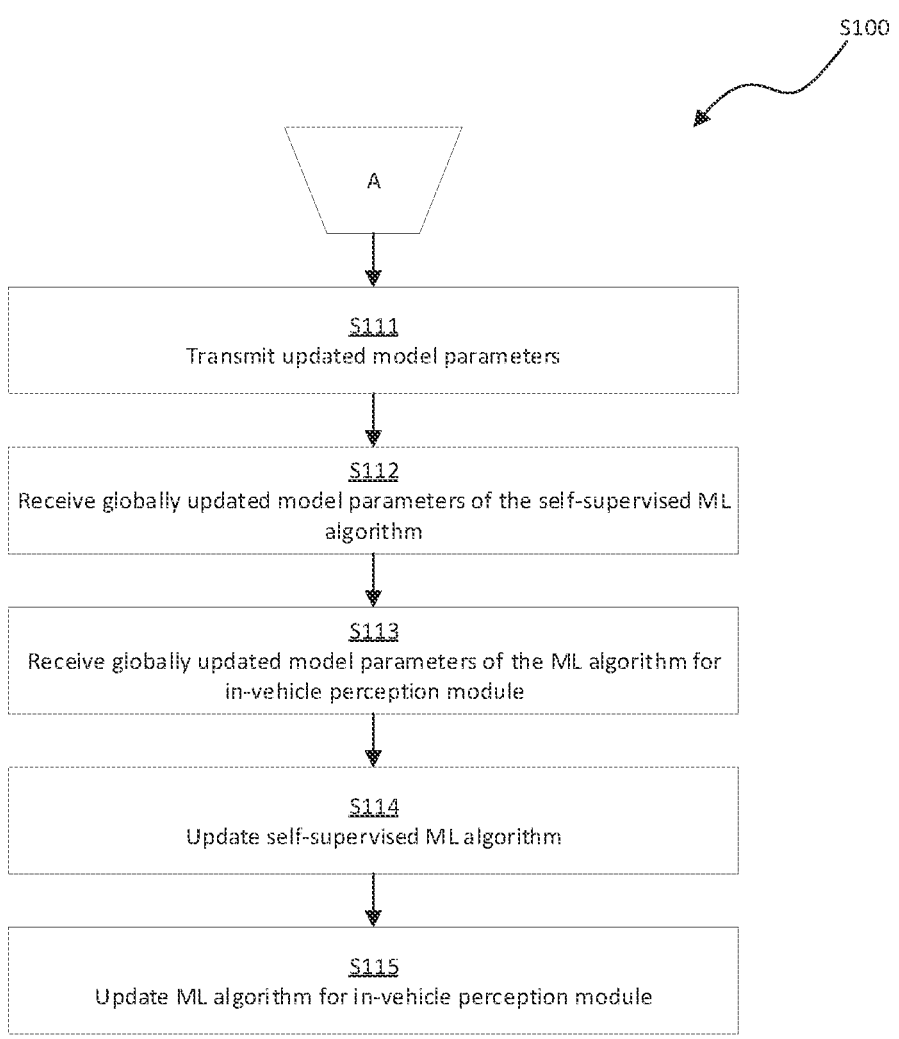
FIG. 2 is a schematic flowchart representation of a method for updating a perception function of an ADS-equipped vehicle in accordance with some embodiments.

FIGS. 1 and 2 is a schematic flowchart representation of a method S100 for updating a perception function of a vehicle having an Automated Driving System (ADS) in accordance with some embodiments. In more detail, the ADS has a self-supervised machine-learning algorithm configured to reconstruct an ingested image and a machine-learning algorithm for an in-vehicle perception module configured to detect one or more objects or free-space areas depicted in an ingested image.

The machine-learning algorithm for the in-vehicle perception module may in some embodiments be configured to ingest an image obtain from a vehicle-mounted sensor and to generate an output image with one or more detected objects or one or more free-space areas, where each detected object or free-space area is indicated in the output image. An "object" may for example be a vehicle such as a car, truck or motorcycle, a pedestrian, a bicycle, a traffic/road sign, a traffic light, road poles, pylons, and so forth.

Detection of "free-space areas" may be understood as a determination of free-space areas i.e. estimates of areas absent of other external objects (static and dynamic objects). One can consider an estimation of "driveable area" in an analogous fashion, where in addition to the estimation of areas absent of objects (as in the case of free space) the "driveable area" estimation also includes the presence of a road surface.

The method S100 is preferably a computer-implemented method S100, performed by a processing system of the ADS-equipped vehicle. The processing system may for example comprise one or more processors and one or more memories coupled to the one or more processors, wherein the one or more memories store one or more programs that perform the steps, services and functions of the method S100 disclosed herein when executed by the one or more processors.

The method S100 comprises obtaining S101 an image of a scene in a surrounding environment of the vehicle. The obtained S101 image may for example be an image or frame captured by a vehicle-mounted camera. However, in some embodiments the image may be in the form of a LiDAR image or a RADAR image.

Further, in some embodiments, the method S100 comprises updating S102 one or more model parameters of the self-supervised machine-learning algorithm in accordance with a self-supervised machine learning process based on the obtained image. The "one or more model parameters" may for example be understood as one or more network weights and/or biases as readily appreciated by the skilled person in the art.

The method S100 further comprises processing S103 the obtained image, by means of the machine-learning algorithm for the in-vehicle perception module, in order to obtain an output image with one or more detected objects or free-space areas, each detected object or free-space area being indicated in the output image. The indications in the output image may for example be in the form of bounding boxes or masking regions.

The "machine-learning algorithm for the in-vehicle perception module" may be referred to as the "production network", "production system", or "perception function of the production system/platform", which the ADS of the vehicle relies upon for various decision and control processes while the vehicle is operating in traffic. In other words, the "production network" may be understood as the tested and validated "vision" or "perception" functionality of the ADS, which is responsible for processing the sensor data from on-board sensors such as cameras, LIDARs and RADARs, ultrasonic sensors, and converting this raw data into scene understanding. The machine-learning algorithm for the in-vehicle perception module may for example be configured to generate bounding boxes for detected objects in an input image, to provide segmentation of objects detected in an input image, or to indicate free-space areas (e.g. by segmentation) in an input image.

The method further comprises forming S104 an evaluation dataset based on the obtained output image. In more detail, the evaluation dataset comprises a plurality of evaluation images corresponding to the scene comprised in the obtained S101 image with masked permutations of the indications of the one or more detected objects or free-space areas in the output image. In other words, the detections (e.g. bounding boxes) in the output image are masked and permuted in different ways to form the evaluation dataset.

In the present context, the term "permutated" or (may also be referred to as "permuted") in reference to the masked indications in the output image are to be understood as "altered", "changed" or otherwise "manipulated" by e.g. changing/altering a size, shape, orientation, and/or position of the masked indication. "Permutated" and "permuted" is used interchangeably herein.

In some embodiments, the step of forming S104 the evaluation dataset comprises forming the plurality of evaluation images by the following process. For each image, permuting and masking S105 each indication of the output image such that each evaluation image comprises the scene comprised in the obtained S101 image with masked permutations of the indications of the one or more detected objects or free-space areas in the output image. Moreover, the permuting and masking S105 is done such that each evaluation image differs from the other evaluation images of the plurality of evaluation images. The permuting may for example be random, i.e. performed in a randomized manner. Further details related to the permutation and masking of the indications are provided in reference to FIG. 4 below, where the indications are in the form of bounding boxes.

In some embodiments, the permutation of each indication comprises a changed/altered size of the indication, a changed/altered shape of the indication, and/or a changed/altered location of the indication (within the frame/image).

Further, the method S100 comprises processing S106 the evaluation dataset and the obtained image, by means of the self-supervised machine-learning algorithm, in order to obtain a reconstruction error value for each evaluation image. More specifically, the evaluation dataset is fed as input to the self-supervised machine-learning algorithm configured to reconstruct an ingested image, and the reconstructed image is subsequently compared to the obtained S101 image to determine the reconstruction error values.

Figure 4:
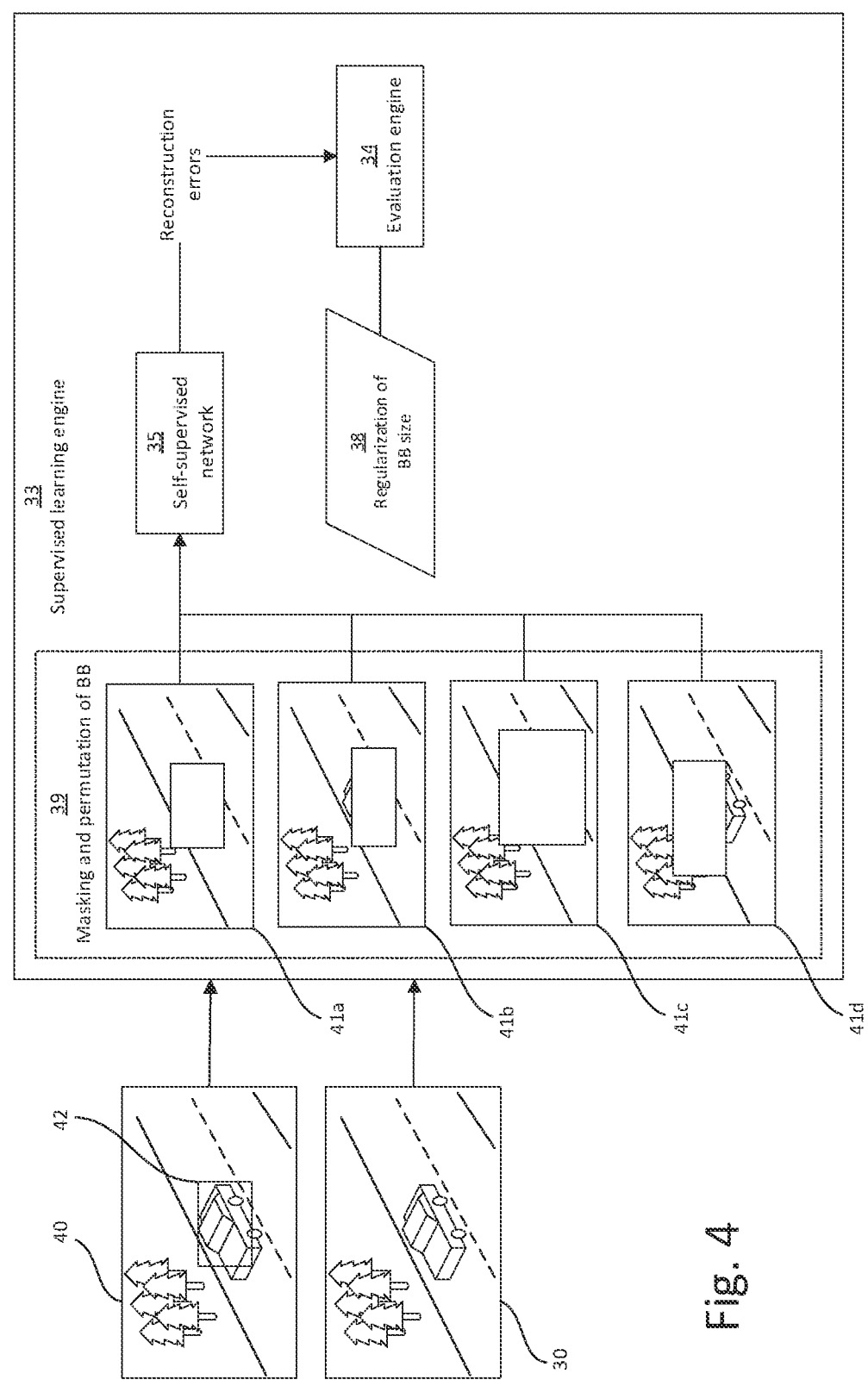
FIG. 4 is a schematic flow diagram of a system for forming an evaluation dataset in accordance with some embodiments.

Turning briefly to FIG. 4, which depicts a schematic flow diagram of a system for forming an evaluation dataset in accordance with some embodiments. More specifically, FIG. 4 serves to illustrate an example embodiment of how the evaluation dataset comprising the plurality of evaluation images 41a-41d may be formed. As illustrated, an output image 40 from the "production network" is provided as input to a supervised learning engine 31 that is configured to mask and permute the output image 40 as indicated in the broken-line box 39. It should be noted that even tough four evaluation images are illustrated, the number of evaluation images may be higher, and in some embodiments the evaluation dataset may comprise thousands or more evaluation images. The number of evaluation images to be formed may be decided based on for example storage capacity and available processing power of the vehicle's hardware platform.

The output image 40 comprises a detected object, here in the form of a car, where the detection is indicated by a bounding box 42. Thus, the output from the "production network" is sent to the supervised learning engine 33, which is configured to mask and permute the bounding box 42 before it is sent to the self-supervised network 35. The permuting of the bounding box may for example comprise one or more of changing a shape of the bounding box, changing a width-to-height ratio of the bounding box, and changing a location of the bounding box (i.e. translating the bounding box in the image/frame). The original image 30, i.e. the image obtained in step S101 in FIG. 1, is also fed to the supervised learning engine as it will be used in the evaluation of the re-constructed image output by the self-supervised network 35.

In more detail, each of the evaluation images 41a-41d are fed to the self-supervised network 35 that is configured to reconstruct the evaluation images 41a-41d. Each of the reconstructed images are then compared to the original input image 30 whereupon a reconstruction error/loss is determined or otherwise obtained for each of the evaluation images. The reconstruction errors are subsequently used by the evaluation engine 34 to generate the loss/cost function for updating the "production network".

Accordingly, if the car is perfectly masked in any of the evaluation images 41a-41d, the self-supervised network 35 will output an image with only road and trees, which in turn will result in a high re-construction error value in reference to the original input image 30. However, if portions of the car are left unmasked the self-supervised network will output an image where some kind of object is rendered, which in turn will result in a lower reconstruction error value as compared to the case where the car was perfectly masked. Thus, by this logic, the evaluation image, and in particular the permuted masking associated with associated with the highest reconstruction error can be used as ground-truth for running a supervised learning process on the "production network". However, this process of selecting the evaluation image whose permuted masking is to form the ground-truth need to be regularised with at least the size of the masked and permuted indications. This is because the maximum reconstruction error would obviously be obtained by masking the entire image.

Thus, in some embodiments, the regularization restriction may be that the evaluation image associated with the highest reconstruction error under a condition of a maximum size of the masked and permuted indication. The maximum size may for example be predefined or set in dependence of the size of the indication in the output image 40 obtained from the "production network". Alternatively, an optimization algorithm may be used, where optimization algorithm is configured to select the evaluation image with the highest reconstruction error relative to mask size is selected. In more detail, a cost/loss function may be employed based on the regularization restriction so that the objective of the optimisation function is to find the mask that maximizes the reconstruction error while minimizing the regularisation penalty.

Moreover, in some embodiments, the regularization restriction may comprise a predefined indication size (e.g. a size or size interval for an object type), and the regularization restriction may accordingly impose a regularization penalty that increases the further away the masked and permuted indications are from the predefined indication size. The size may for example be defined by an area of the indication, circumference of the indication, width and height of the indication, a volume of the indication, and so forth.

Further, in some embodiments, the predefined indication size may be defined by the size (and optionally the geometry) of the initial detection (i.e. of the indication 42 in the output image 40). Similarly, the regularization restriction may accordingly impose a regularization penalty that increases the further away the masked and permuted indications are from the size (and optionally the geometry) of the initial detection (i.e. of the indication 42 in the output image 40).

Moreover, in some embodiments, the set of evaluation images comprises one image that only has masked each indication of the output image. In other words, no permuting of the masked indication is performed for one image in the evaluation dataset. Thereby it is possible to reduce the risk of pushing erroneous updates of the "production network" if the production network already made a perfect or near-perfect indication.

Reverting back to FIG. 1, the method S100 further comprises selecting S107 an evaluation image out of the plurality of evaluation images, wherein the selected evaluation image has the highest reconstruction error value under a regularization restriction defined based on at least a size of the masked and permutated indications. Then, one or more model parameters (e.g. weights and biases) the machine-learning algorithm for the in-vehicle perception module is updated/trained S108 based on the obtained S101 image and the selected S107 evaluation image, wherein the permutated indication of the selected evaluation image defines a ground truth. In some embodiments, the machine-learning algorithm for the in-vehicle perception module is updated/trained S108 using a supervised learning process where the obtained S101 image and the permutated indication of the selected S107 evaluation image forms an "input-output pair". In particular, the obtained S101 image may form an input object and the permutated indication of the selected S107 evaluation image forms a desired output (i.e. supervisory signal) in a supervised learning process. In more detail, from the selected S107 evaluation image one obtains the masked and permutated indication that most likely corresponded to the best detection of one or more objects or free-space area. From this evaluation image, one can then derive the desired output for the "production network" as it is represented by the permutated indication. Thus, in some embodiments, the method S100 may comprise removing the masking of the masked and permuted indication of the selected S107 evaluation image in order to obtain the desired output.

In some embodiments, the method S100 further comprises detecting S109 anomalous image data by using a machine-learning classification system trained to distinguish new experiences from experiences known to the self-supervised machine-learning algorithm in the obtained image and to output an anomaly value. The output anomaly value may be compared with a threshold, and the updating S108 of the machine-learning algorithm for the in-vehicle perception module is only performed if the anomaly value is below a threshold. In some embodiments, the machine-learning classification system comprises an autoencoder (such as e.g., a Variational Autoencoder) trained on the same dataset as the self-supervised machine-learning algorithm, and wherein the anomaly value is a reconstruction error.

Accordingly, in some embodiments, a machine-learning classification system, for example, an autoencoder, is trained to assess the experiences a vehicle encounters (depicted in the obtained S101 image) and to classify the experience as new (meaning new or rare) experiences or as known (meaning previously used to configure or develop the self-supervised machine-learning algorithm) experiences. Advantageously, by using an autoencoder, the reconstruction error properties of the autoencoder can be used to exaggerate anomalous scenarios captured by the vehicle's on-board sensor(s) which allows anomalies representing new or rare experiences to be detected with more sensitivity than other machine learning data classification models may be capable of at the same level of computational complexity. In other words, it is possible to determine more accurately when a new or rare experience has been encountered by a vehicle by using an autoencoder machine learning model.

In more detail, by using an autoencoder algorithm, anomalous behaviour can be more easily detected S109 as the reconstruction error will exaggerate input data that was not included in the training data of the self-supervised machine-learning algorithm. Any suitable autoencoder model algorithm can be used providing it has sufficient input dimensionality to process at least the obtained S101 image representing either a scene or scenario and/or a buffer of data, for example, a 30-second buffer of image data. By training the autoencoder using the training data used to configure and/or develop the self-supervised machine-learning algorithm, any new data not included in the training data for the autoencoder should be distinguishable from the training data in the decoded output of the autoencoder by having a larger reconstruction error.

In some embodiments, a threshold is set for the reconstruction error to distinguish output from the decoding layer of the autoencoder which was not included in the training data for the autoencoder (and consequently for the self-supervised machine-learning algorithm) and which may be classified as an anomaly from output which was included in the training data. Any suitable autoencoder model may be used.

Moreover, the reconstruction error may be used to calculate/determine the "anomaly value" and consequently to calculate a weight that is added to the supervisory signal in the supervised learning S108 process. For example, a large reconstruction error will lead to a low weight that is added to the supervisory signal (i.e. the supervisory signal has little-to-no effect on the updating S108 of the "production network"). In some embodiments, a large reconstruction error (over a threshold) results in a disablement of the supervisory signal (i.e. weight is set to zero). In other words, if the obtained image leads to a large enough reconstruction error, the update S108 of the one or more model parameters of the machine-learning algorithm for the in-vehicle perception module may be skipped for that cycle. In some embodiments the "weight" is a value between 0 and 1 where a larger reconstruction error results in a weight closer to 0 (or a weight value equal to zero) in comparison with a smaller reconstruction error, which results in a weight closer to 1 (or a weight value equal to 1) that is added to the supervisory signal. The term "added" in the context of "adding a weight to the supervisory signal" may be understood as multiplied, or simply that the supervisory signal is "weighted" with the calculated S110 weight value, as readily understood by the skilled person in the art.

Moreover, the machine-learning classification system is preferably updated jointly with the self-supervised machine-learning algorithm so that the two networks maintain consistency with respect to the consumed training data.

Further, in some embodiments a Federated learning (FL) scheme may be utilized, where the method S100 comprises transmitting S111 the updated S102 one or more model parameters of the self-supervised machine-learning algorithm and the updated S108 one or more model parameters of the machine-learning algorithm for the in-vehicle perception module to a remote entity (e.g. a central entity such as a fleet management system or "back-office"). The method S100 may accordingly further comprise receiving S112 a set of globally updated one or more model parameters of the self-supervised machine-learning algorithm from the remote entity. The set of globally updated one or more model parameters of the self-supervised machine-learning algorithm are based on information obtained from a plurality of vehicles comprising a corresponding self-supervised machine-learning algorithm. Similarly, a set of globally updated one or more model parameters of the machine-learning algorithm for the in-vehicle perception module from the remote entity are received S113. The set of globally updated one or more model parameters of the machine-learning algorithm for the in-vehicle perception module are based on information obtained from a plurality of vehicles comprising a corresponding machine-learning algorithm for the in-vehicle perception module.

The method S100 may further comprise updating S114 the self-supervised machine-learning algorithm based on the received set of globally updated one or more model parameters of the self-supervised machine-learning algorithm, and updating S115 the machine-learning algorithm for the in-vehicle perception module based on the received set of globally updated one or more model parameters of the machine-learning algorithm for the in-vehicle perception module.

In general, the phrase "one or more model parameters" in reference to the obtaining or receiving steps as used herein serves to encompass embodiments where a version of the associated ML algorithm is already available at the receiving entity, wherefore only the updated model parameters (e.g. network weights and/or biases) need to be available in order to update the entire ML algorithm. Thereby bandwidth utilization may be improved as less data needs to be transmitted. However, as readily understood by the skilled reader, in some embodiments all of the model parameters of the associated ML algorithm is transmitted/received or otherwise communicated.

Executable instructions for performing these functions are, optionally, included in a non-transitory computer-readable storage medium or other computer program product configured for execution by one or more processors.

Figure 3:
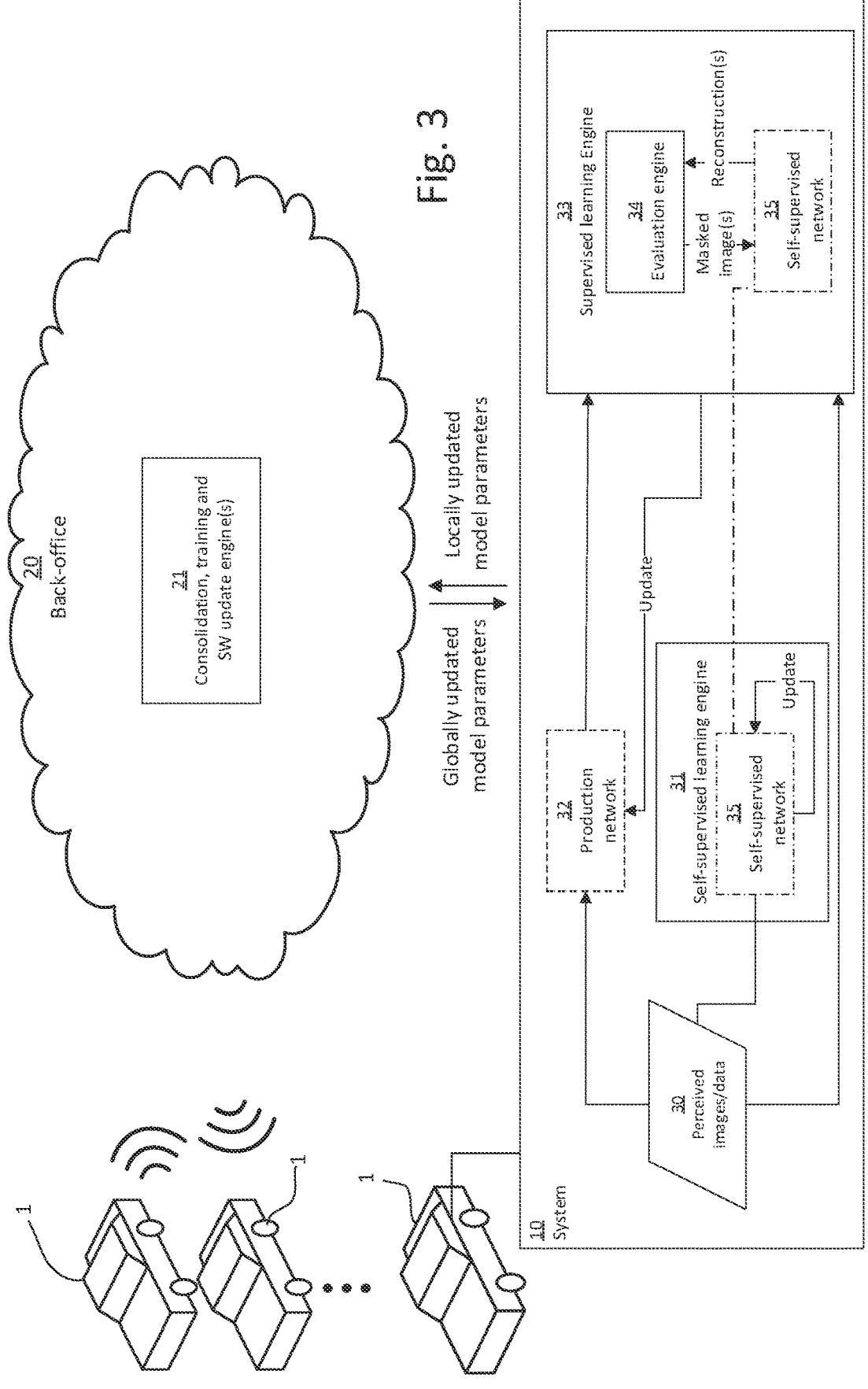
FIG. 3 is a schematic block diagram of a system for updating a perception function of an ADS-equipped vehicle in accordance with some embodiments.

FIG. 3 is a schematic block diagram representation of a system 10 for updating a perception function of vehicle 1 in accordance with some embodiments. FIG. 3 serves to further elucidate the above-described embodiments related to update procedure of the "production network" 35 by schematically illustrating the flow of information and the various process steps. The processing system 10 comprises control circuitry (e.g. one or more processors) configured to perform the functions of the method S100 disclosed herein, where the functions may be included in a non-transitory computer-readable storage medium or other computer program product configured for execution by the control circuitry. However, in order to better elucidate the present invention, the control circuitry (ref. 11 in FIG. 5) is represented as various "modules" or blocks 31, 32, 33 in FIG. 3 each of them linked to one or more specific functions of the control circuitry.

The system 10 is capable of transmitting and receiving data to/from a remote entity, here in the form of a "back-office" or fleet management system 20. Cellular communication technologies may be used for long range communication between the vehicle 1 and the remote entity 20. Examples of cellular radio technologies are GSM, GPRS, EDGE, LTE, 5G, 5G NR, and so on, also including future cellular solutions. However, as readily understood by the skilled reader other communication technologies such as Wifi/Ethernet are feasible.

Details related to the type of machine-learning algorithms or networks and their architectures, network updating/training processes, etc. have been discussed in detail in the foregoing, and will for the sake of brevity and conciseness not be repeated again with respect to FIG. 3. It is presumed that the person skilled in the art readily understands that the corresponding examples and features discussed in the foregoing are analogously applicable with respect to FIG. 3.

The system 10 is suitable for updating a perception function of a vehicle having an Automated Driving System (ADS). The ADS has a self-supervised machine-learning algorithm configured to generate a reconstruct and ingested image and a machine-learning algorithm 32 for an in-vehicle perception module trained to provide a perception functionality based on an ingested image. As mentioned previously, the ADS of the vehicle 1 employs a "production network" 32 for providing a perception functionality to the various operational tasks of the ADS. In particular the "production network" 32 is used to detect one or more objects or free-space areas contained in an image provide from a vehicle mounted sensor (e.g. a camera image, a LiDAR image, a RADAR image, etc.) for the decision and control functions of the ADS.

Thus, the purpose of the self-supervised network 35 as disclosed herein is predominantly to support the training/updating procedure of the production network 32. It should be noted that even though the self-supervised network 35 is depicted in two separate modules 31, 33 in the system 10 they are to be understood as one and the same network (as indicated by the dashed-dotted line). The division of the self-supervised network 35 in FIG. 3 is mainly for illustrative purposes and clarity. It should be noted that the production network 32 and/or the self-supervised network 35 need not necessarily be comprised by the system 10, but may be part of a separate sub-system of the ADS, such as e.g. a perception system of the ADS, however, the production network 32 and the self-supervised network 35 are then accessible by the system 10. Moreover, the system 10 may be a sub-system of the perception system/block of the ADS.

The system 10 comprises control circuitry (see e.g. ref 11 in FIG. 5) configured to obtain an image 30 of a scene in a surrounding environment of the vehicle 1. In some embodiments, the control circuitry is further configured to update one or more model parameters of the self-supervised machine-learning algorithm 35 in accordance with a self-supervised machine learning process based on the obtained one or more images. As mentioned, the self-supervised machine-learning algorithm may be trained by manipulating (e.g. withholding) parts of an image and instructing the algorithm to reconstruct the manipulated image as part of its learning process. The process of the updating the self-supervised machine-learning algorithm may for example be controlled by a self-supervised learning engine/module 31.

Further, the control circuitry is configured to process the obtained image 30, by means of the machine-learning algorithm for the in-vehicle perception module, in order to obtain an output image 40 with one or more detected objects or free-space areas, each detected object or free-space area being indicated in the output image. The control circuitry is further configured to form an evaluation dataset 39) based on the obtained output image 40. The evaluation dataset comprises a plurality of evaluation images 41a, 41b, 41c, 41d corresponding to the scene comprised in the obtained image with masked permutations of the indications of the one or more detected objects or free-space areas in the output image.

In some embodiments, the control circuitry 11 is configured to, for each evaluation image, permute and mask each indication 42 of the output image such that each evaluation image comprises the scene comprised in the obtained image with masked permutations of the indications of the one or more detected objects or free-space areas in the output image and such that each evaluation image differs from the other evaluation images of the plurality of evaluation images, in order to form the evaluation dataset 39.

Still further, the control circuitry 11 is configured to process the evaluation dataset 39 and the obtained image, by means of the self-supervised machine-learning algorithm 35, in order to obtain a reconstruction error value for each evaluation image, and then select an evaluation image out of the plurality of evaluation images 41a-41d. The selected evaluation image has the highest reconstruction error value under a regularization restriction out of the plurality of evaluation images 41a-41d. The regularization restriction may, in accordance with some embodiments, be defined based on at least a size of the masked and permuted indications.

The control circuitry 11 is further configured to update one or more model parameters (e.g. weights and biases) of the machine-learning algorithm for the in-vehicle perception module based on the obtained image 30 and the selected evaluation image, wherein the permuted indication of the selected evaluation image defines a ground truth. In some embodiments, the machine-learning algorithm for the in-vehicle perception module 32 is updated/trained using a indicated by the supervised learning engine/module 33 configured to use the obtained image and the permutated indication of the selected evaluation image to form an "input-output pair". In particular, the obtained image may form an input object and the permutated indication of the selected evaluation image forms a desired output (i.e. supervisory signal) in a supervised learning process. In more detail, from the selected evaluation image one obtains the masked and permutated indication that most likely corresponded to the best detection of one or more objects or free-space area. From this evaluation image, one can then derive the desired output for the "production network" as it is represented by the permutated indication. Thus, in some embodiments, the control circuitry may be configured to remove the masking of the masked and permuted indication of the selected evaluation image in order to obtain the desired output (ground truth).

In some embodiments, the system 10 may comprise an anomaly detection function to reduce the risk of pushing erroneous updates of the production network 32. In more detail, the control circuitry may be further configured to detect anomalous image data by using a machine-learning classification system (not shown) trained to distinguish new experiences from experiences known to the self-supervised machine-learning algorithm in the obtained image and to output an anomaly value. Accordingly, the control circuitry 11 may be configured to only update the machine-learning algorithm for the in-vehicle perception module if/when the anomaly value is below a threshold. This may for example be achieved by using the anomaly value (e.g. reconstruction error if the machine-learning classification system is an autoencoder), to calculate/determine a weight to be added to the supervisory signal. Thereby, the potential negative impact of erroneous learning may be reduced if there is reason to believe that the output from the self-supervised network is of low quality.

In some embodiments, the machine-learning classification system trained to distinguish new experiences from experiences known to the self-supervised machine-learning algorithm may for example comprise an autoencoder (such as e.g., a Variational Autoencoder) trained on the same dataset as the self-supervised machine-learning algorithm, and wherein the anomaly value is a reconstruction error.

The system 10 may also be arranged to adopt a federated learning scheme. In more detail, in some embodiments, the control circuitry 11 is configured to transmit the (locally) updated model parameters of the self-supervised machine-learning algorithm 35 and the machine-learning algorithm 32 for the perception module to a remote entity (e.g. a central processing system) 20. The remote entity may receive several locally updated model parameters from a plurality of vehicles 1, and control circuitry 21 configured to consolidate these local updates and form globally updated versions of the ML algorithms 32, 35. The globally updated model parameters may be subsequently pushed out to the fleet of vehicles 1.

Figure 5:
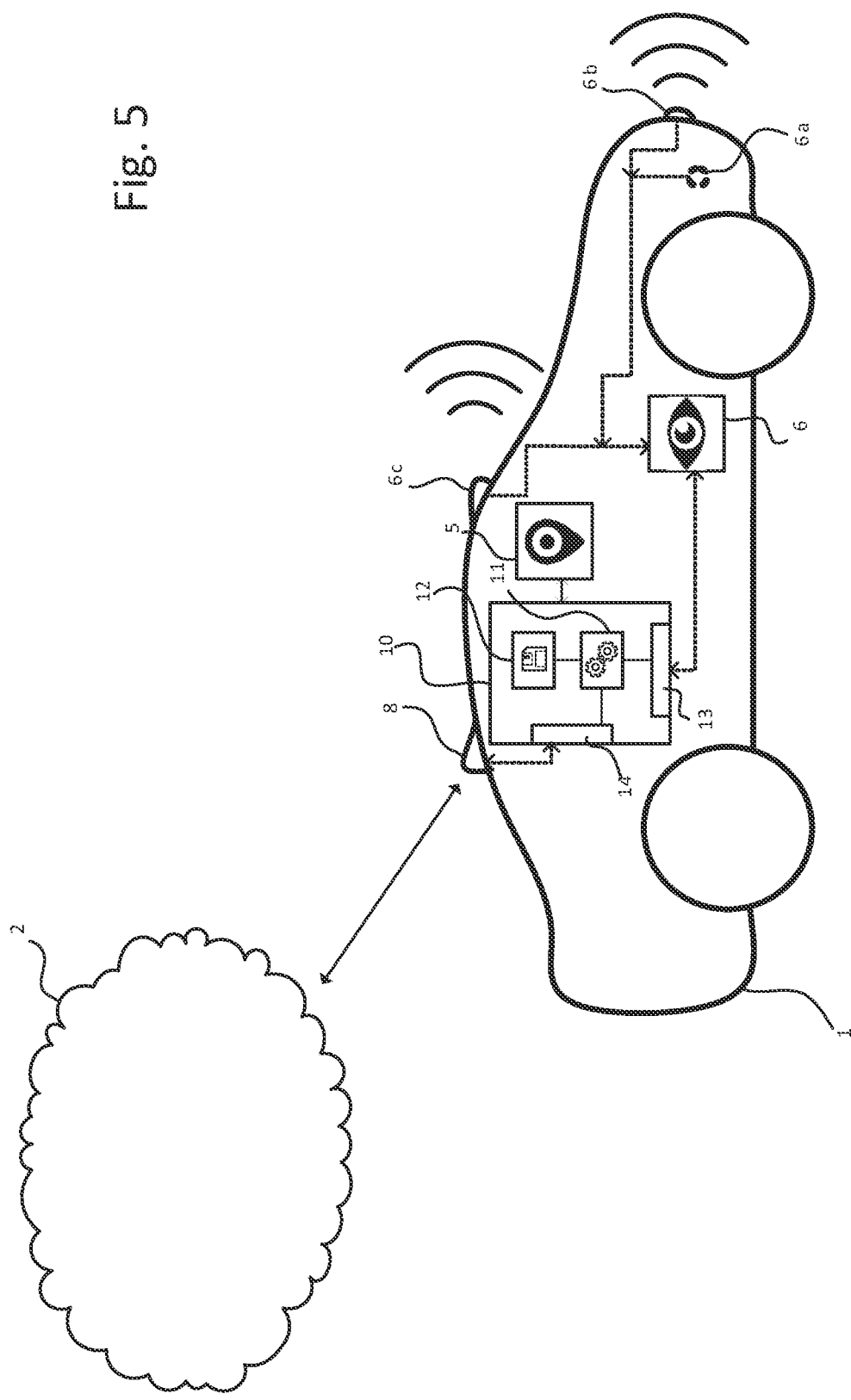
FIG. 5 is a schematic illustration of a vehicle comprising a system for updating a perception function of an ADS-equipped vehicle in accordance with some embodiments.

FIG. 5 is a schematic side view of an ADS-equipped vehicle 1 comprising a system 10 for updating a perception function of the ADS in accordance with some embodiments. The system comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for updating a perception function of a vehicle having an Automated Driving System (ADS) according to any one of the embodiments disclosed herein.

Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The system 10 may also comprise any suitable sensor interfaces 13 and communication interfaces 14 as known in the art.

In some embodiments, the vehicle 1 comprises a perception system 6 or perception block 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The machine-learning algorithm for the in-vehicle perception module may be comprised by the perception system 6, and the perception system 6 as such may be part of the ADS platform. The localization system 5 is configured to monitor a geographical position and heading of the vehicle, and may be in the form of a Global Navigation Satellite System (GNSS), such as a GPS. However, the localization system may alternatively be realized as a Real Time Kinematics (RTK) GPS in order to improve accuracy.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

In summary, and in accordance with the technology disclosed herein, a self-supervised network is deployed locally in an ADS-equipped vehicle. The self-supervised network can then continuously (or at least while being parked if computational resources are unavailable during operations) ingest the scenes (images) experienced by the ADS for self-supervised learning. However, for real-time operation the ADS employs a separate "production network" that is locally updated using the teachings disclosed herein. Furthermore, the process may be further adopted in a federated learning scheme where the local updates from a fleet of such vehicles are consolidated centrally and pushed out as global updates of the two networks 32, 35.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The device may also have a communication/antenna interface 13 that may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also;

however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as defined in the below described patent claims should be apparent for the person skilled in the art.

The invention claimed is:

1. A computer-implemented method for updating a perception function of a vehicle having an Automated Driving System (ADS), wherein the ADS comprises a self-supervised machine-learning algorithm configured to reconstruct an ingested image and a machine-learning algorithm for an in-vehicle perception module configured to detect one or more objects or free-space areas depicted in an ingested image, the method comprising:

obtaining, by a processing unit, an image of a scene in a surrounding environment of the vehicle;

processing, by the processing unit, the obtained image, by the machine-learning algorithm for the in-vehicle perception module, in order to obtain an output image with one or more detected objects or free-space areas, each detected object or free-space area is indicated in the output image;

forming, by the processing unit, an evaluation dataset based on the obtained output image, wherein the evaluation dataset comprises a plurality of evaluation images corresponding to the scene comprised in the obtained image with masked permutations of the indications of the one or more detected objects or free-space areas in the output image;

processing, by the processing unit, the evaluation dataset and the obtained image, by means of the self-supervised machine-learning algorithm, in order to obtain a reconstruction error value for each evaluation image;

selecting, by the processing unit, an evaluation image out of the plurality of evaluation images, wherein the selected evaluation image has the highest reconstruction error value under a regularization restriction defined based on at least a size of the masked and permuted indications; and updating, by the processing unit, the machine-learning algorithm for the in-vehicle perception module based on the obtained image and the selected evaluation image, wherein the permuted indication of the selected evaluation image defines a ground truth.

2. The computer-implemented method according to claim 1, wherein each detected object or free-space area is indicated by at least one of:

a bounding box, and a masking region.

3. The computer-implemented method according to claim 1, wherein the indications are permuted differently in each evaluation image.

4. The computer-implemented method according to claim 1, wherein the forming the evaluation dataset comprises forming the plurality of evaluation images, and for each evaluation image:

permuting and masking, by the processing unit, each indication of the output image such that each evaluation image comprises the scene comprised in the obtained image with masked permutations of the indications of the one or more detected objects or free-space areas in the output image and such that each evaluation image differs from the other evaluation images of the plurality of evaluation images.

5. The computer-implemented method according to claim 4, wherein the permutation of each indication comprises at least one of changing a size of the indication, changing a shape of the indication, and changing a location of the indication.

6. The computer-implemented method according to claim 5, wherein the indication is in the form of a bounding box, and wherein the changing the shape of the indication comprises changing a width-to-height ratio of the bounding box.

7. The computer-implemented method according to claim 1, wherein the self-supervised machine-learning algorithm comprises a Masked Autoencoder (MAE).

8. The computer-implemented method according to claim 1, further comprising:

detecting, by the processing unit, anomalous image data using a machine-learning classification system trained to distinguish new experiences from experiences known to the self-supervised machine-learning algorithm in the obtained image and to output an anomaly value;

wherein the updating the machine-learning algorithm for the in-vehicle perception module is only performed if the anomaly value is below a threshold.

9. The computer-implemented method according to claim 1, further comprising:

updating, by the processing unit, one or more model parameters of the self-supervised machine-learning algorithm in accordance with a self-supervised machine learning process based on the obtained image.

10. The computer-implemented method according to claim 9, further comprising:

transmitting, by the processing unit, the updated one or more model parameters of the self-supervised machine-learning algorithm and the updated one or more model parameters of the machine-learning algorithm for the in-vehicle perception module to a remote entity;

receiving, by the processing unit, a set of globally updated one or more model parameters of the self-supervised machine-learning algorithm from the remote entity, wherein the set of globally updated one or more model parameters of the self-supervised machine-learning algorithm are based on information obtained from a plurality of vehicles comprising a corresponding self-supervised machine-learning algorithm;

receiving, by the processing unit, a set of globally updated one or more model parameters of the machine-learning algorithm for the in-vehicle perception module from the remote entity, wherein the set of globally updated one or more model parameters of the machine-learning algorithm for the in-vehicle perception module are based on information obtained from a plurality of vehicles comprising a corresponding machine-learning algorithm for the in-vehicle perception module;

updating, by the processing unit, the self-supervised machine-learning algorithm based on the received set of globally updated one or more model parameters of the self-supervised machine-learning algorithm; and updating, by the processing unit, the machine-learning algorithm for the in-vehicle perception module based on the received set of globally updated one or more model parameters of the machine-learning algorithm for the in-vehicle perception module.

11. A non-transitory computer-readable storage medium comprising instructions which, when executed by a computing device, causes the computing device to carry out method according to claim 1.

12. A system for updating a perception function of a vehicle having an Automated Driving System (ADS), wherein the ADS comprises a self-supervised machine-learning algorithm configured to reconstruct an ingested image and a machine-learning algorithm for an in-vehicle perception module configured to detect one or more objects or free-space areas depicted in an ingested image, the system comprising control circuitry configured to:

obtain an image of a scene in a surrounding environment of the vehicle;

process the obtained image by the machine-learning algorithm for the in-vehicle perception module, in order to obtain an output image with one or more detected objects or free-space areas, each detected object or free-space area is indicated in the output image;

form an evaluation dataset based on the obtained output image, wherein the evaluation dataset comprises a plurality of evaluation images corresponding to the scene comprised in the obtained image with masked permutations of the indications of the one or more detected objects or free-space areas in the output image;

process the evaluation dataset and the obtained image, by means of the self-supervised machine-learning algorithm, in order to obtain a reconstruction error value for each evaluation image;

select an evaluation image out of the plurality of evaluation images, wherein the selected evaluation image has the highest reconstruction error value under a regularization restriction defined based on at least a size of the masked and permuted indications; and update the machine-learning algorithm for the in-vehicle perception module based on the obtained image and the selected evaluation image, wherein the permuted indication of the selected evaluation image defines a ground truth.

13. The system according to claim 12, wherein the control circuitry is further configured to form the plurality of evaluation images, and for each evaluation image:

permute and mask each indication of the output image such that each evaluation image comprises the scene comprised in the obtained image with masked permutations of the indications of the one or more detected objects or free-space areas in the output image and such that each evaluation image differs from the other evaluation images of the plurality of evaluation images, in order to form the evaluation dataset.

14. A vehicle comprising a system according to claim 12.

* * * * *